United States Patent [19]

Schaap et al.

[11] 4,436,715

[45] Mar. 13, 1984

[54] STORAGE AND RETRIEVAL OF SINGLET OXYGEN

[75] Inventors: A. Paul Schaap, Detroit; George E. Busch, Milan; Robert L. Nolen, Jr., Ann Arbor, all of Mich.

[73] Assignee: KMS Fusion, Inc., Ann Arbor, Mich.

[21] Appl. No.: 302,033

[22] Filed: Sep. 14, 1981

[51] Int. Cl.$^3$ .............................................. C01B 13/00
[52] U.S. Cl. ............................... 423/579; 204/158 R; 204/159.2; 428/524; 428/119; 525/387; 568/558
[58] Field of Search .................... 423/579; 260/340.3; 525/387; 526/268; 428/119.9, 524

[56] References Cited

U.S. PATENT DOCUMENTS 4,315,998  2/1982  Neckers et al. .................... 525/332

FOREIGN PATENT DOCUMENTS 53-56697  5/1978  Japan ............................... 260/340.3

OTHER PUBLICATIONS

Kearns, "Physical and Chemical Properties of Singlet Molecular Oxygen," *Chemical Reviews*, vol. 71, No. 4 (1971), pp. 395–411.
Bergmann et al, "Transannular Peroxides," *Chemical Reviews*, vol. 28 (1941), pp. 367, 368, 380–392.
Chemical Abstracts 116992n.
Gollnick, "Photooxygenation Reactions in Solution," *Advances in Photochemistry*, vol. 6, No. 1 (1968), pp. 1–5, 27–40.

*Primary Examiner*—Earl C. Thomas
*Assistant Examiner*—Wayne A. Langel
*Attorney, Agent, or Firm*—Barnes, Kisselle, Raisch, Choate, Whittemore & Hulbert

[57] ABSTRACT

This invention relates to production of singlet oxygen and includes means and methods for storage and retrieval thereof as well as continuous production from ground state oxygen. With respect to storage and retrieval of singlet oxygen, certain aromatic acceptor compounds are oxidized to yield solid endoperoxides which, in turn, are decomposed to yield singlet oxygen and regenerate the acceptor. Continuous production of singlet oxygen occurs through irradiation of dye sensitizers with electromagnetic radiation causing activation thereof and excitation of flowing ground state oxygen.

16 Claims, No Drawings

STORAGE AND RETRIEVAL OF SINGLET OXYGEN

The present invention relates to gaseous electronically excited molecular oxygen, termed singlet oxygen in the art, and more particularly to storage and retrieval thereof from a solid phase. Yet more particularly, the invention relates to solid endoperoxide dispersions which, upon activation, yield singlet oxygen; to methods of making such dispersions; to endoperoxide polymers useable in such dispersions; and to precursor polymers for these endoperoxide polymers.

BACKGROUND OF THE INVENTION

Singlet oxygen had heretofore been studied intensively. See, for example, "Singlet Molecular Oxygen" edited by A. P. Schaap, (Dowden, Hutchinson and Ross), 1976; and "International Conference on Singlet Molecular Oxygen and Its Role in Environmental Sciences," Annals of the New York Academy of Sciences, Vol. 171, Act. I, pages 1-302 (1970).

In addition to use in scientific or research-related fields, singlet oxygen has been proposed for a number of applications. For example, singlet oxygen chemically pumps iodine gas lasers. Applications of the latter and other types, however, require substantial volumes and concentrations of singlet oxygen.

Convenient and efficient production of singlet oxygen has yet to be accomplished in the art. Although certain solvent based reactions generate significant amounts of singlet oxygen, such processes possess a number of inheret limitations. The liquid solvent, as well as cryogenic traps and the like for removal of coincidentally produced impurities, tend to qunch the singlet oxygen as the latter is produced and consequently limit efficiency of these generators. Moreover, since the by-products of these solvent based reactions are not regenerated into the initial reactants, the utility of these systems is further compromised. Furthermore, use of the aforementioned solvent based reactions can be harardous and require massive apparatus.

It has been recognized that irradiation of gaseous ground state oxygen with laser, microwave or other electromagnetic radiation converts ground state oxygen to singlet oxygen. But these techniques do not store singlet oxygen and, moreover, do not generate singlet oxygen in desired quantities and at sufficient rates.

Solid phase generators containing temporarily bound singlet oxygen avoid certain of these problems of quenching, bulky apparatus and storage discussed above. Murray et al, "Singlet Oxygen Sources in Ozone Chemistry, Chemical Oxygenations Using Adducts Between Phosphite Esters and Ozone", J. Amer. Chem. Soc. 91 (19), 5358-64 (1961) suggests that singlet oxygen can be generated directly into the gas phase from solid phosphite ester and ozone adduct dispersions. But the phosphite ester and ozone adducts are not regenerable and require extremely low temperatures for storage.

OBJECTS AND SUMMARY OF THE INVENTION

A general object of the present invention is to provide a method of storing singlet oxygen generated by one or more conventional low-efficiency sources for subsequent retrieval in desired quantities. Another and related object of the invention is to provide a method of retrieving the oxygen so stored.

A further and yet more specific object of the invention is to provide a method of storing singlet oxygen in solid phase, and a method of releasing singlet oxygen so stored. A related object is to provide a solid phase precursor or acceptor which may be caused chemically to trap and store singlet oxygen from other sources, and to release such stored oxygen on demand, with the solid phase acceptor being recyclable for subsequent trapping and storing of singlet oxygen as previously described.

Yet another object of the invention is to provide a method of manufacturing the above-described acceptor substrate.

Still another object of the invention is provide a method for continuous production of singlet oxygen in quantity without intermediate storage thereof.

Briefly stated, the singlet oxygen generators of this invention comprise solid phase recyclable endoperoxides. These endoperoxides may be thermally or otherwise decomposed to release singlet oxygen; they may then be regenerated by a subsequent reoxidation process. The oxidizable precursor (i.e. the "acceptor") to the endoperoxide selectively comprises a fused ring organic compound which may be caused to react with singlet oxygen, so that the acceptor may be utilized chemically to trap and concentrate singlet oxygen from a variety of low efficiency sources.

Oxidation of the acceptor may in accordance with the invention be triggered using solar radiation. A variety of select sensitizers, activated at differing solar wavelengths, can convert ground state oxygen to singlet oxygen that oxidizes the acceptor. Thus, the present invention may provide a means for long term storage of solar energy and furthermore gives rise to the promise of solar powered chemically pumped lasers.

The present invention contemplates (for lasers or other such applications) a singlet oxygen generator which comprises a container or the like for enclosing a subatmospheric environment and a dispersion of solid endoperoxide in the container. The endoperoxide includes a number of fused rings, with one of the rings being aromatic. An aliphatic and adjacently fused second ring has an oxygen-oxygen group that bridges across non-adjacent carbons. The solid endoperoxide dispersion provides a plurality of molecular oxygen diffusable passages that lead from an interior portion of the dispersion and open at the surface thereof so as to communicate with the surrounding subatmospheric environment. For release of the stored oxygen, means are provided for decomposing the endoperoxide to provide singlet oxygen as a product thereof in subatmospheric environment.

In other applications, the dispersion may be employed to generate singlet oxygen in the presence of a liquid. In these latter embodiments, the solid endoperoxide is suspended in a liquid reaction medium with oxidizable substrate.

The solid phase generator of the present invention may take several forms. The dispersion may comprise one or more porous polymer beads, with the fused rings being pendant from the backbone of the polymer. The dispersion may comprise hollow silica glass bubbles individually coated on the exterior with endoperoxide. The dispersion may comprise a plurality of concentric thermally conductive tubes individually coated on the interior and exterior with the endoperoxide. Still further, the dispersion may comprise a porous ceramic body with endoperoxide coated thereon. The endoperoxide preferably includes fused rings in which the aforesaid second ring is substituted aliphatically at the non-adjacent carbon atoms so bridged by the oxygen-oxygen group. The means to decompose the endoperoxide may comprise suitable means to heat the dispersion to temperatures between, for example, 25°–180° C. Other suitable decomposition means may be utilized.

In still another aspect of this invention, singlet oxygen is produced continuously from ground state oxygen by exposure of a mass of the latter to dye sensitizer excited by electromagnetic radiation and in relative movement with the mass.

DETAILED DESCRIPTION OF THE PREFERRED EMBODIMENTS

The acceptor of this invention oxidizes to form a stable oxygen-containing compound which, in turn, decomposes to yield singlet oxygen while advantageously regenerating the acceptor. Aromatics which oxidize to form stable endoperoxides desirably serve as acceptors.

Aromatic benzoid compounds (i.e. compounds having a six member aromatic carbon ring) with substitution that donates electrons to the ring may serve as acceptors. Among these aromatic acceptors are fused ring aromatics that oxidize to form solid endoperoxides having a first ring which is aromatic and an aliphatic and adjacently fused second ring with an oxygen-oxygen group bridging across non-adjacent carbons thereof. Among these fused ring commpounds are acceptors of the formula:

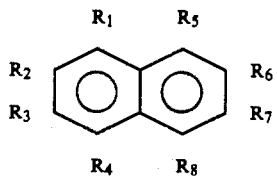

I which oxidize to endoperoxides of the formula:

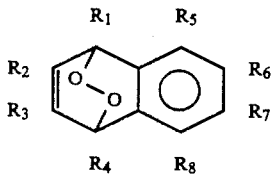

II wherein $R_2$—$R_8$ are independently hydrogen or have 1 to 8 carbons, and $R_1$ and Rhd 4 each have at least one carbon. Compounds of I with additional fused rings (e.g. when $R_2$ and $R_3$ are part of another aromatic ring such as in anthracenes and napthacenes, or when $R_3$ and $R_4$ are part of another aromatic ring such as in phenanthrenes), provide suitable acceptors, as do compounds in which any of the R's individually comprise an aromatic ring. Naphthanlenes of I, however, are readily available and manipulable for purposes of the invention, and for these reasons are presently preferred.

Accetors of I in which $R_1$ and $R_4$ link to the ring through apiphatic carbon provide endoperoxides with desirable stability. Acceptors of I in which $R_5$—$R_8$ are independently lower alkyl modify temperatures at which the endoperoxides II give off singlet oxygen.

Suitable acceptors includes 1, 4 dialkyl naphthalenes such as 1, 4 butyl naphthalenes; 1, 4 alkylaryl naphthalenes such as 1, 4-propyl phenyl naphthalene; 1, 4 substituted hydrocarbyl naphthalenes such as 1, 4 ethyl chlorophenyl naphthalene; and anthracenes such as 9, 10 dimethylanthracenes.

In one embodiment, an acceptor of I is prepared by reaction of a fused ring compound of formula I but wherein one of the R's (preferably $R_1$) has a reactive moiety. This reactive moiety reacts with a complementary reactive moiety of a solid polymer. The complementarily reactive moiety pends from the backbone of the polymer. For example, compounds of the following formula may serve as acceptors of this embodiment

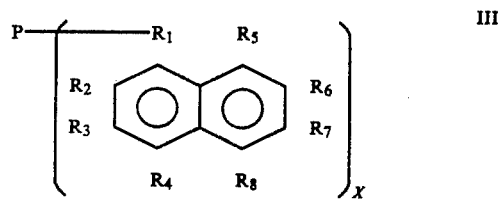

III wherein $R_1$ is a divalent linking group of at least one carbon, P is a porous solid polymer carrying $R_1$ pendant from its backbone, X is the number of linkable sites linked to $R_1$'s on the backbone of P, and $R_2$—$R_8$ are as above. Preferably $R_4$ is an alkyl of about 1 to 8 carbons. $R_1$ of III is exemplified by groups having an ester or ether moiety with up to about 10 carbons. P is exemplified by porous solid divinylbenzene-styrene copolymers, especially divinylbenzene-styrene copolymers in which the units derived from divinylbenzene account for less than about 25%, e.g. 1%, of the copolymer.

The reaction of solid polymer P with a fused ring compound both having a complementary reactive substituent occurs such that the fused ring compound becomes linked at the surface of the solid polymer. Exemplary linking reactions include addition and condensation reactions such as etherification, amidation, acylation and alkylation.

The polymer III oxidizes in accordance with this invention to an endoperoxide polymer of the formula:

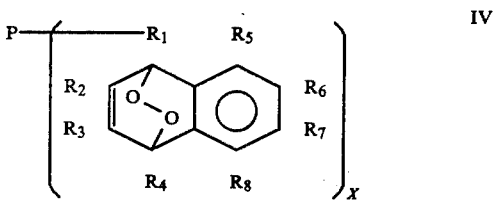

IV where P, X and $R_1$—$R_8$ are as above. Advantageously, polymer IV may be in the form of one or more porous polymer beads. To generate singlet oxygen, the beads are heated (e.g. at 25° to 180° C.) in a vacuum or in the presence of a buffer gas for gas phase production, or heated in a suitable solvent for use in liquid applications. Singlet oxygen in either case issues from the surface of the beads.

In other embodiments, the endoperoxide of II may be monomeric (e.g. $R_1$ has between about 1 to 8 carbons) and deposited on a porous solid. For example, a monomeric endoperoxide of II may be dissolved or suspended in a suitable liquid carried and deposited upon small (e.g. 50–100 microndiameter) hollow silica or silica-glass bubbes or microspheres. The bubbles are heated to release singlet oxygen. Alternatively, an endoperoxide of II is deposited on parallel thermally conductive tubes of glass or metal for example. The tubes may be interconnected by thermally conductive struts which space and support the tubes internally. One end or both ends of the tubes open to a vacuum which, as the tubes are heated, receives singlet oxygen. Still further, the endoperoxide may be deposited on a porous ceramic. When the ceramic is heated, singlet oxygen is released from the ceramic to its surrounding environment.

Endoperoxides of II may be made from the aforementioned acceptors of I in any suitable manner. Moreover, rather than physically depositing a endoperoxide on a porous substrate, the acceptor may first be deposited on a porous substrate and then suitably oxidized.

Any suitable oxidation technique may be used to make endoperoxides of this invention. Acceptors of I may be exposed to singlet oxygen generated from sources such as: (1) mixtures of chlorine gas and hydrogen peroxide; (2) electromagnetic energy from mercury or sodium lamps, lasers, microwave generators or the sun (optionally in presence of dye sensitizers such as Rose Bengal, methylene blue, fluorescin, eosin Y and the like) acting on ground state oxygen; and/or (3) solid adducts such as phosphite esters and ozone. Advantageously, these sources may be used in combination to effect more expeditious oxidation.

The reaction of the acceptor with singlet oxygen may be in the presence or absence of liquid reaction media. When liquid reaction media is used to suspend the acceptor, singlet oxygen may be generated in situ or bubbled through the media. Dye sensitizers may be used to enhance oxidation in the presence or absence of liquid reaction media. When the electromagnetic radiation is used to excite the sensitizers, it will normally have a wavelength in the range of 300 to 800 nm.

A particularly desirable oxidation technique utilizes solar energy. The acceptor is exposed to ground state oxygen in the presence of dye sensitizers such as noted above. The dye sensitizers are selected so that the reaction media absorbs via the sensitizers a range of solar energy wavelengths. Thus, the oxidation takes place with little need for auxiliary energy input.

In one application of this technique, singlet oxygen is stored in endoperoxide form for later regeneration upon demand. Oxygen is admitted to a mixed bed of acceptor and dye sensitizers bathed in ground state oxygen while being exposed to solar radiation. The dye sensitizers accept a wide range of radiation wavelengths and transmit radiation energy to the oxygen. The oxygen, so excited to singlet oxygen, oxidizes the acceptor in the bed.

Advantageously, if storage of singlet oxygen is not desired, the acceptor may be omited and a continuous stream of singlet oxygen formed by irradiation of the dye sensitizers with solar or other electromagnetic radiation in the presence of a stream of ground state oxygen. The dye sensitizers are dispersed in a vacuum by deposition on solid phase substrates, as described above, so that the oxygen can contact them while they are excited electronically by electromagnetic radiation of appropriate wavelength.

EXAMPLES

A. 1-Methyl-4-(Chloromethyl) Naphthalene

To a mixture of 9.9 gm paraformaldehyde, 23 ml glacial acetic acid and 32 ml concentrated hydrochloric acid heated at 40° C. were added 0.15 grams hydrophosphoric acid and 25 gm naphthalene. This mixture was heated to 85° to 88° C. for eight hours, at which time TLC indicated complete reaction. The product was washed with water, and extracted with dichloromethane. The dichlormethane product was washed again with a saturated solution of sodium chloride, followed by neutralization with sodium bicarbonate. The dichloromethane layer was dried with magnesium sulfate. The resulting yellow oil was vacuum distilled to yield the product of example A as a white solid.

B. 1-Methyl-4(Ethyl Malonate Methyl) Naphthalene

A sodium ethozide solution was made by dissolving 0.27 mg sodium in 10 ml absolute ethyl alcohol. To this solution, 0.84 grams ethyl malonate were added dropwise. To the clear solution was added 1 gm of the white solid of example A. The suspension was refluxed until TLC indicated a complete reaction. After the ethanol was removed, the residue was extracted and washed to leave the substituted malonate as a yellowish oil.

C. Ethyl 1-(4-Methylnaphthalene) propanoate

To a solution of 20 ml dimethyl sulfoxide and 0.5 gm water were added 0.25 gm potassium chloride and 1 gram of the product of example B. The solution was stirred under argon at 160° C. until TLC taken 24 hours later indicated completion. Extraction with water and ether, followed by drying with magnesium sulfate and removal of ether, gave a light yellow oil. MPLC gave the product of example C as a yellow solid.

D. 1-(4-methylnaphthalene) propanoic acid

The light yellow oil of example C was dissolved in 100 ml methanol. To this solution was added a solution of sodium hydroxide (30 gm in 80 ml water). The solution was refluxed 10 hours and thereafter showed no ester. The methanol was removed and the remaining solution acidified with hydrochloric acid (2N). A muddy white solid was filtered away from the water and dissolved in ethyl acetate. Recrystallization from dichloromethane yielded D as a whitish solid (MP 156° to 158° C.).

E. 1-(4-methylnaphthalene) propanoate salts

Salts were made by adding a solution of 1 gram of the product of D in acetone, in turn, to (a) potassium carbonate, (b) sodium bicarbonate, (c) lithium carbonate and (d) cesium bicarbonate in a minimum amount of water. The sodium salt could be recystallized. The others formed after removal of solvent by vacuum.

F. Carboxylate polymer of reaction E

The sodium salt of reaction E (1.04 gm) was dissolved in 25 ml purified N, N-dimethylformamide. Biobeads SX-1, a chloromethylated styrene-divinyl benzene copolymer having the characteristics: 4 milliequivalents of chlorine, 1 gm of activated sites for reaction with the sodium salt of E, from Bio-Rad Laboratories, Inc., were added and the slurry stirred at 50° to 55° C. under argon until reaction complete (by uv). The slurry was filtered, washed with DMF, DMF/water, ethanol, and dichloromethane. The polymer was extracted overnight with dichloromethane. (Biobeads SX-1 has 1% divinylbenzenes units by weight).

G. Rose Bengal Adduct with the product of reaction F

The polymer of F was resuspended in 50 ml of dichloromethane, to which were added 100 ml of $10^{-4}$ mole Rose Bengal in acetone. The solvent was removed and the polymer dried.

H. Endoperoxide of G

A suspension of the product of reaction G (0.477 gm) was suspended in 20 ml of dichloromethane. The latter suspension was stirred under oxygen (751.8 mm) at $-78°$ C. and irradiated with a 400 watt sodium lamp. When the polymer stopped absorbing oxygen, the lamp was extinguished, and the polymer was filtered, washed with cold solvent and stored in a freezer at 20° C.

I. When the product of reaction H is heated in air, in the dark a light emission is visible. This result may be indicative of release of singlet oxygen.

J. The polymer of H was suspended in a solvent, oxidized tetramethylethylene (TME), to produce 3-hydroperoxy -2, 3-dimethyl -1- butene which, when reduced with reducing agents, yielded 3-hydroxy -2, 3 -dimethyl -1- butene. Gas chromotography indicated seventy percent of the available oxygen in the polymer of H had reacted to cause oxidation in the reaction media.

For purposes of this invention, "endoperoxide" is intended to encompass compounds of a type having an aliphatic carbon ring and an oxygen-oxygen group that bridges non-adjacent carbon atoms of that ring. "Singlet oxygen" is intended to have its accepted meaning as comprising a metastable excited form of molecular oxygen possessing either about 22 kcal./mole or 37 kcal./mole excitation energy. "Ground state oxygen" refers to a form of molecular oxygen which can be excited to singlet oxygen. "Sensitizer" refers to a compound which, when electronically excited, can transfer electronic energy by molecular collision and convert ground state oxygen to singlet oxygen.

The invention claimed is:

1. A solid phase generator for releasing singlet oxygen in gas phase which comprises an endoperoxide molecular dispersion on a solid phase substrate of material selected from the group consisting of polymers, ceramics, silica glasses and metals, said endoperoxide having fused rings with a first of said rings being aromatic and a second of said rings being in aliphatic ring adjacently fused to said first ring with an oxygen-oxygen group bridging across non-adjacent carbons of said second ring, said dispersion on said substrate having a plurality of passages for diffusion of gas phase singlet oxygen from an interior portion of said dispersion to the surface thereof.

2. The generator set forth in claim 1 wherein said endoperoxide molecular dispersion is chemically attached to said solid phase substrate.

3. The generator in accordance with claim 2 wherein said substrate comrises a porous solid phase polymer, said fused rings being pendant from the backbone of the polymer.

4. The generator in accordance with claim 1 wherein said substrate comprises a hollow glass bubble exteriorly coated with said endoperoxide.

5. The generator in accordance with claim 1 wherein said substrate comprises parallel thermally conductive tubes of material selected from the group consisting of silica glasses and metals, and individually exteriorly coated with said endoperoxide.

6. The generator in accordance with claim 1 wherein said substrate comprises a porous ceramic.

7. The generator in accordance with claim 1 or 2 wherein said oxygen-oxygen group bridges across non-adjacent carbon atoms that are substituted aliphatically.

8. The generator in accordance with claim 7 which further comprises means for heating said dispersion and substrate.

9. The generator in accordance with claim 8 wherein said means for heating said dispersion and substrate comprises means for irradiating said dispersion and substrate with infrared radiation.

10. The method in accordance with claim 1 wherein said decomposing step (b) comprises the step of heating said dispersion and substrate.

11. The method in accordance with claim 1 wherein said dispersion and substrate comprises a polymer of the formula:

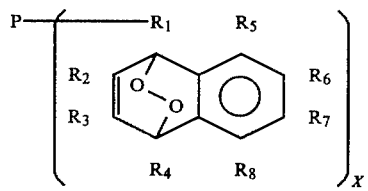

wherein P is a solid polymer; $R_1$ is a divalent linking group of up to about 10 carbons; $R_2$—$R_8$ are independently hydrogen or have about 1 to 8 carbons; and X is the number of linkable sites linked to the $R_1$'s on the backbone of P.

12. The method in accordance with claim 11 wherein P is a styrene divinyl benzene compolymer.

13. A method of generating singlet oxygen in gas phase comprising the steps of:
   (a) providing a molecular dispersion of endoperoxide bound to a solid phase substrate of material selected from the group consisting of polymers, ceramics, silica glasses and metals, said endoperoxide having fused rings with a first of said rings being aromatic and a second of said rings being an aliphatic ring adjacently fused to said first ring with an oxygen-oxygen group bridging across non-adjacent carbons of said second ring, said dispersion on said substrate having a plurality of passages for diffusion of gas phase singlet oxygen from an interior portion of said dispersion to the surface thereof, and
   (b) decomposing said endoperoxide so as to release said oxygen-oxygen group as molecular singlet oxygen in gas phase while retaining the product of said endoperoxide decomposition as a dispersion of hydrocarbon acceptor molecules chemically bound to said solid phase substrate.

14. The method set forth in claim 13 comprising the further steps of:
   (c) retrieving said solid phase substrate following said step (b) with said molecular acceptor dispersion chemically bound thereto, and then
   (d) regenerating said endoperoxide molecular dispersion by oxidizing said acceptors retrieved in said step (c) to form a closed cycle for storage of singlet oxygen in solid phase and retrieval of singlet oxygen in gas phase.

15. The method set forth in claim 14 wherein said step (d) comprises the step of exposing said substrate and acceptor dispersion retrieved in said step (c) to electromagnetic radiation in the presence of a dye sensitizer.

16. The method set forth in claim 15 wherein said step (d) comprises the step of exposing said substrate and said acceptor dispersion retrieved in said step (c) to electromagnetic energy at a plurality of wavelengths in the presence of a plurality of dye sensitizers individually sensitive to said plurality of wavelengths.

* * * * *

UNITED STATES PATENT AND TRADEMARK OFFICE
CERTIFICATE OF CORRECTION

PATENT NO. : 4,436,715

DATED : March 13, 1984

INVENTOR(S) : A. Paul Schaap, George E. Busch, Robert L. Nolen, Jr.

It is certified that error appears in the above-identified patent and that said Letters Patent are hereby corrected as shown below:

Col. 1, Line 35, change "qunch" to "quench".

Col. 1, Line 42, change "harardous" to "hazardous".

Col. 2, Line 14, after "is" insert "to".

Col. 3, Line 51, change "Rhd4" to "$R_4$".

Col. 3, Line 61, change "Accetors" to "Acceptors".

Col. 3, Line 62, change "apiphatic" to "aliphatic".

Col. 4, Line 67, change "bubbes" to "bubbles".

Col. 5, Line 19, change "mixtures" to "admixtures".

Col. 5, Line 23, change "fluorescin" to "fluorescein".

Col. 5, Line 54, change "omited" to "omitted".

Col. 6, Line 5, change "dichlormethane" (second occurrence) to "dichloromethane".

Col. 6, Line 52, change "recystallized" to "recrystallized".

Col. 6, Line 64, after "reaction" add "was".

UNITED STATES PATENT AND TRADEMARK OFFICE
CERTIFICATE OF CORRECTION

PATENT NO. : 4,436,715
DATED : March 13, 1984
INVENTOR(S) : A. Paul Schaap, George E. Busch, Robert L. Nolen, Jr.

It is certified that error appears in the above-identified patent and that said Letters Patent are hereby corrected as shown below:

Col. 7, Line 15, change "20°C" to "-20°C".

Col. 7, Line 19, after "H" insert -- , --.

Col. 7, Line 47, change "in" to "an".

Signed and Sealed this

Fifth Day of February 1985

[SEAL]

Attest:

DONALD J. QUIGG

Attesting Officer     Acting Commissioner of Patents and Trademarks